(12) United States Patent
Rosenbaum et al.

(10) Patent No.: US 6,851,647 B1
(45) Date of Patent: Feb. 8, 2005

(54) PORTABLE CATAPULT LAUNCHER FOR SMALL AIRCRAFT

(75) Inventors: Bernard J. Rosenbaum, Seabrook, TX (US); George E. Petter, Houston, TX (US); Joseph A. Gessler, Houston, TX (US); Michael G. Hughes, Pasadena, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/417,377

(22) Filed: Apr. 3, 2003

(51) Int. Cl.[7] ................................................ B64F 1/06
(52) U.S. Cl. ...................................................... 244/63
(58) Field of Search ............................. 244/63; 124/17, 124/18, 19, 20.1, 21, 22

(56) References Cited

U.S. PATENT DOCUMENTS

| | | | |
|---|---|---|---|
| 922,710 A | | 5/1909 | Means |
| 1,353,663 A | * | 9/1920 | Napier ........................ 124/26 |
| 1,388,361 A | | 8/1921 | Mesurier |
| 1,749,357 A | | 3/1930 | Schmelz |
| 1,960,264 A | * | 5/1934 | Heinkel ....................... 244/63 |
| 2,843,342 A | * | 7/1958 | Ward ........................... 244/63 |
| 2,856,139 A | * | 10/1958 | Lockwood .................. 244/63 |
| 2,860,620 A | | 11/1958 | Effinger, Jr. |
| 2,921,574 A | * | 1/1960 | Saito ........................... 124/29 |
| 3,068,612 A | | 11/1962 | Simpson |
| 3,138,352 A | * | 6/1964 | Saholt ......................... 244/63 |
| 3,392,937 A | | 7/1968 | Riblett, Jr. |
| 3,534,929 A | * | 10/1970 | Johansen et al. ............ 244/63 |
| 3,905,350 A | | 9/1975 | Becker |
| 3,968,947 A | | 7/1976 | Schlegel et al. |
| 4,014,246 A | | 3/1977 | Nissley, Jr. |
| 4,060,930 A | | 12/1977 | Hirtle et al. |
| 4,079,901 A | | 3/1978 | Mayhew et al. |
| 4,238,093 A | * | 12/1980 | Siegel et al. ................ 244/63 |
| 4,279,195 A | | 7/1981 | Miller |
| 4,333,382 A | | 6/1982 | Holt et al. |
| 4,678,143 A | | 7/1987 | Griffin |
| 4,909,458 A | | 3/1990 | Martin |
| 5,303,695 A | * | 4/1994 | Shopsowitz .................. 124/17 |
| 5,671,722 A | | 9/1997 | Moody |
| 5,695,153 A | | 12/1997 | Britton et al. |
| 6,626,399 B2 | * | 9/2003 | Young et al. ................ 244/63 |

* cited by examiner

*Primary Examiner*—Tien Dinh
(74) *Attorney, Agent, or Firm*—Theodore U. Ro

(57) ABSTRACT

An apparatus for launching an aircraft having a multiplicity of interconnected elongated tracks of rigid material forming a track system and wherein each elongated track has a predetermined elongated track cross-sectional design, a winch system connected to the track system wherein the winch system has a variable mechanical advantage, one or more elongated elastic members wherein one end of each of the one or more elongated elastic members is adjustably connected to the track system, and a carrier slidably mounted to the track system wherein the carrier is connected to the winch system and to the other end of each of the one or more elongated elastic members.

12 Claims, 16 Drawing Sheets

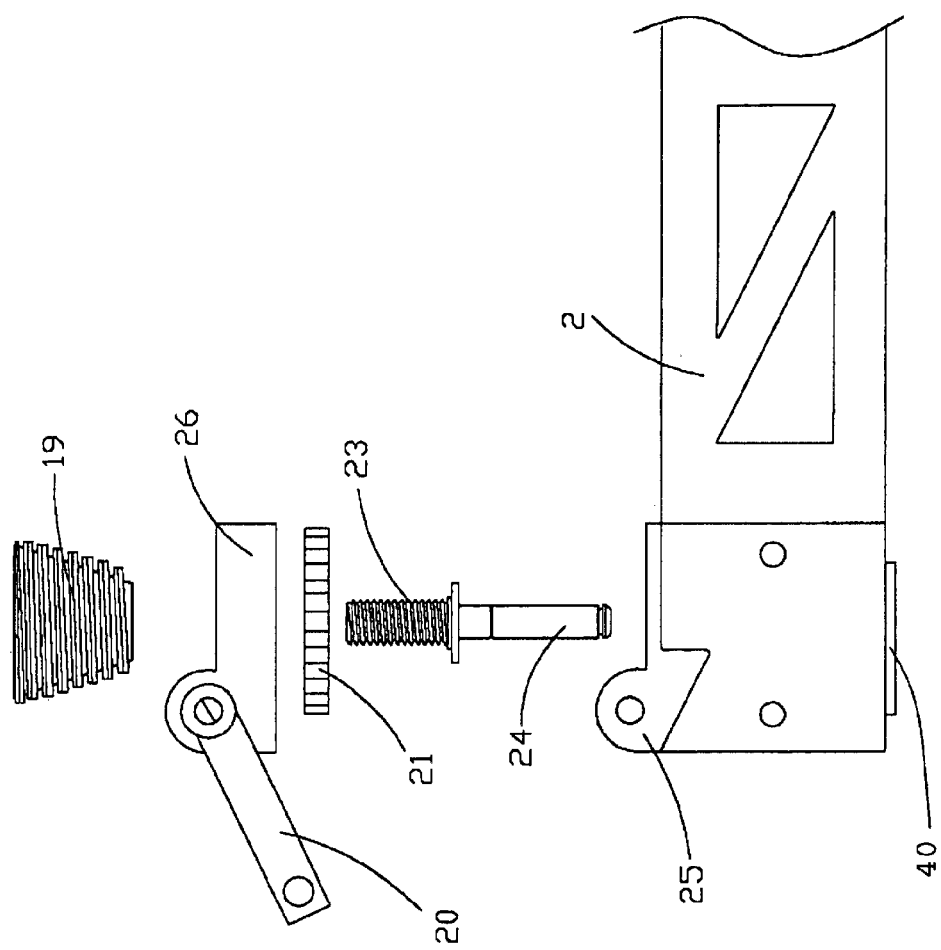

PORTABLE CATAPULT LAUNCHER FOR SMALL AIRCRAFT

ORIGIN OF THE APPARATUS

The apparatus described herein was made by employee(s) of the United States Government and may be manufactured and used by or for the Government of the United States of America for governmental purposes without the payment of any royalties thereon or therefor.

BACKGROUND

The basic problem was the lack of a lightweight, portable apparatus capable of being carried and operated by a person to launch unmanned, remotely piloted surveillance aircraft, especially as it applies to rugged, remote sites often encountered in military applications (including anti-terrorism special operation missions). Other needs for such an apparatus include homeland defense applications and planetary exploration, such as surveillance of Martian terrain.

Launching unmanned, remotely piloted surveillance aircraft is traditionally achieved by operating from a preconstructed runway surface to gain takeoff speed or by using a heavy, trailer-mounted catapult system that is not practical for remote surveillance applications. Further, in the case of using a runway surface, such a surface is generally not available for remote operations.

While trailer-mounted catapult or runway systems are adequate for the basic purpose and function for which they have been specifically designed, they are uniformly deficient with respect to their failure to provide a lightweight, portable launch mechanism that is capable of being carried, and operated, by a person to launch an unmanned, remotely piloted aircraft at a remote location.

Description

BRIEF DESCRIPTION OF THE DRAWINGS

FIG. 7A. is a side, exploded view of an embodiment of a winch system in relation to an elongated track.

DETAILED DESCRIPTION

Figure 1:
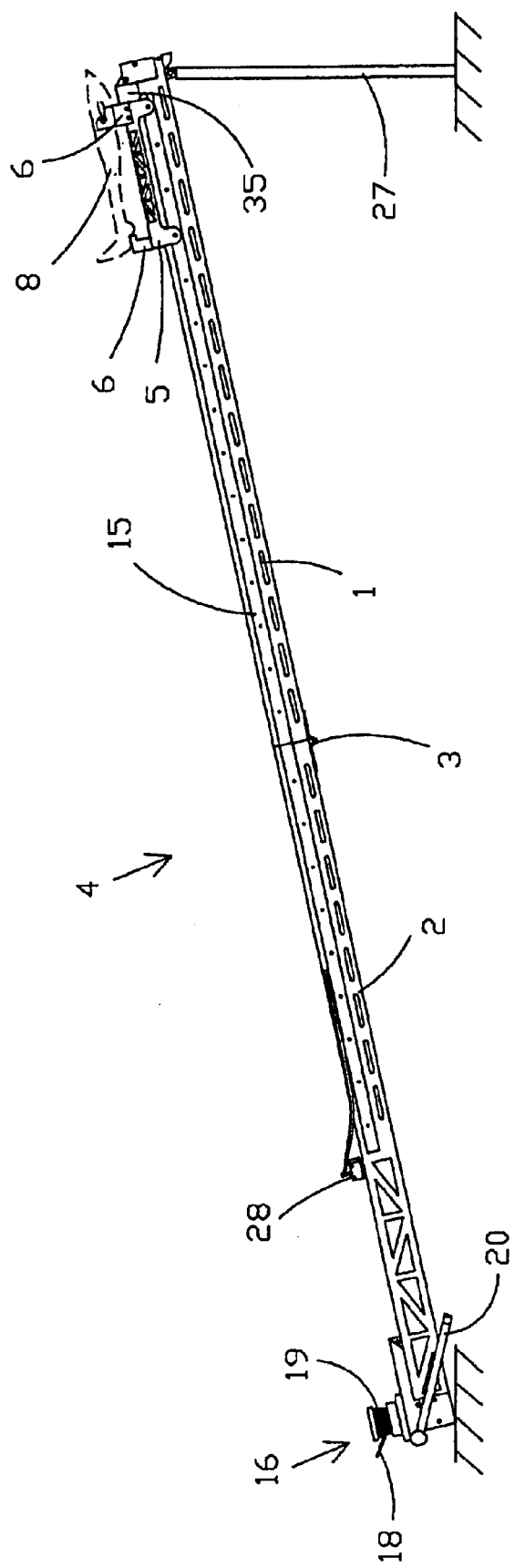
FIG. 1. is a side view of an embodiment of an apparatus.
Figure 4:
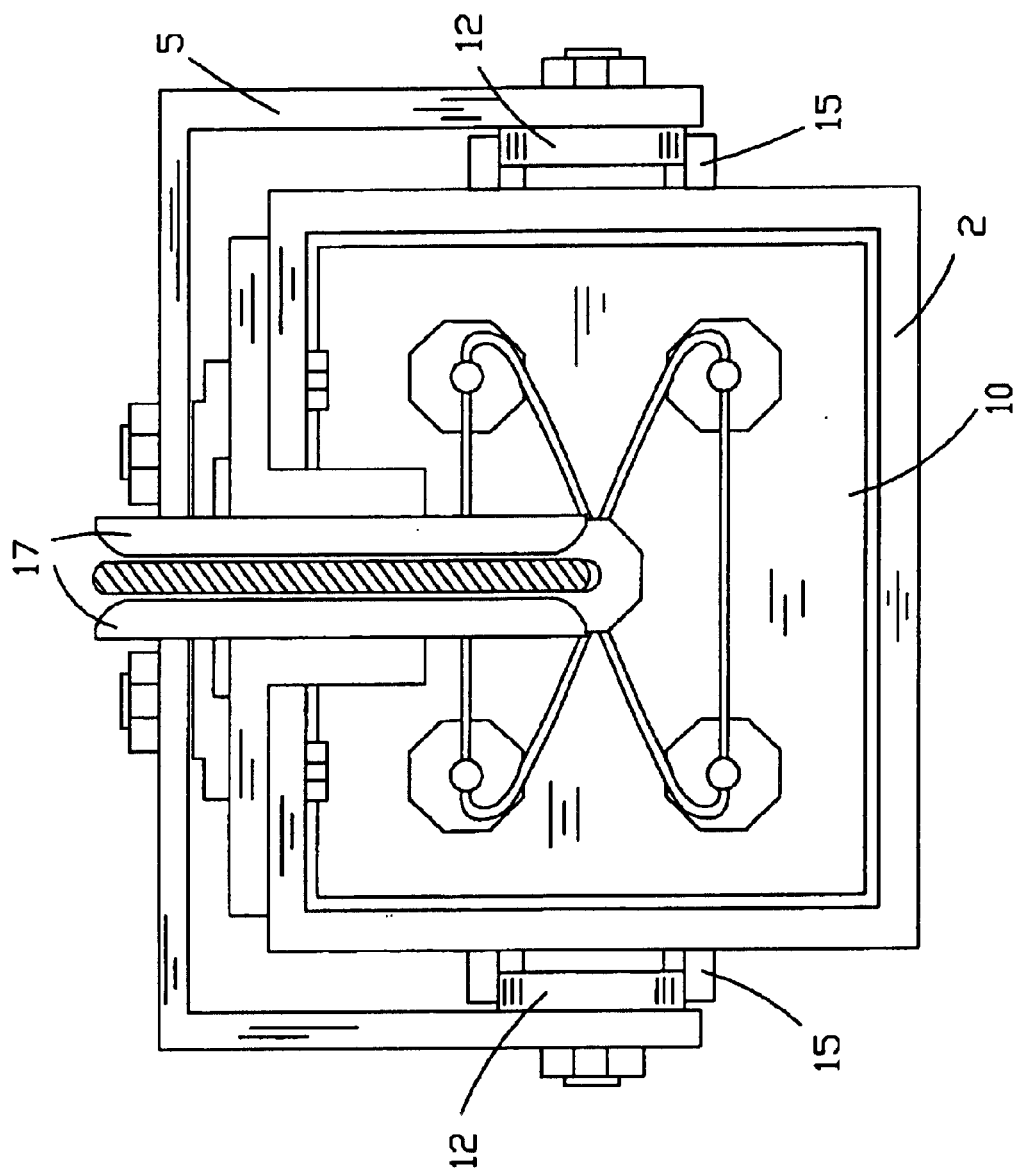
FIG. 4. is an end view of an embodiment of an apparatus with selected components.

FIG. 1 shows an embodiment of the apparatus, which includes one elongated track 1 and another elongated track 2 interconnected by a hinge 3 to form a track system 4. The elongated tracks in this embodiment include a cross-sectional area having a generally rectangular design as illustrated in FIG. 4. In another embodiment, three or more elongated tracks are used (not shown). Multiple embodiments for cross-sectional designs exist, for example, such as the ones illustrated in FIGS. 5A and 5B. The elongated tracks may be of equal or unequal lengths. In the embodiment illustrated in FIG. 1 and FIG. 4, the generally rectangular cross-sectional design results in elongated tracks that are not flat, but rather, generally resemble a beam in shape. A material for the elongated tracks may comprise anodized aluminum, however, other materials such as non-anodized aluminum, other types of metal, wood, plastic, and graphite may be used. With continued reference to FIG. 1 and FIG. 4, the embodiment incorporates two grooves, each groove 15 located on opposite longitudinal sides of each elongated track, whereby the grooves extend the full length of the track system 4. These grooves 15 can be integrated into the elongated tracks separately or through a molding process. Regardless of how the grooves are integrated, the grooves 15 are part of the track system 4. In another embodiment, with reference to FIGS. 10 and 11, flanges 40, located on opposite longitudinal sides of each elongated track, are used. As will be discussed below, these grooves 15 or flanges 40 are used as the primary means to slidably mount a carrier on the track system 4. Further, utilizing the cross-sectional design illustrated in FIG. 4 results in a cavity that extends the entire length of each elongated track. In this embodiment, due to the aforementioned cavity in this embodiment, the elongated tracks are not solid to the core and thus, weight savings are achieved. In another embodiment (not shown), solid (i.e., solid to the core) elongated tracks are used.

Figure 3:
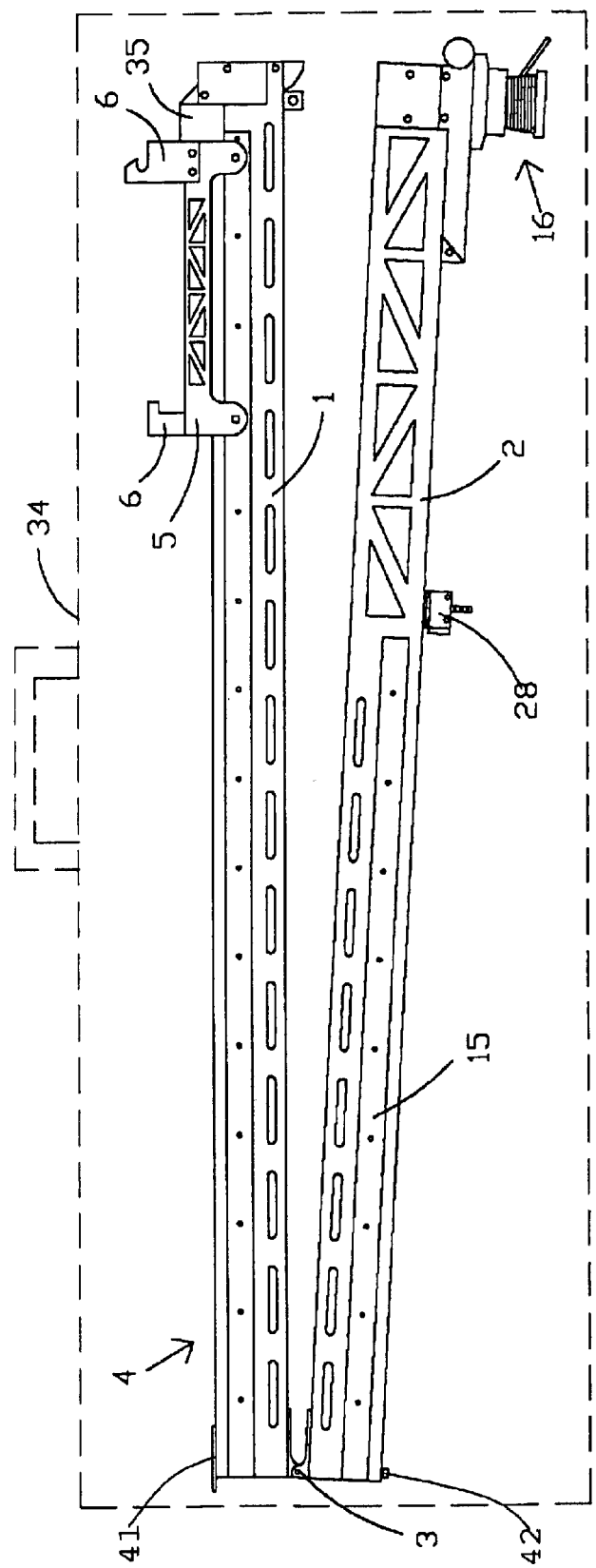
FIG. 3. is a side view of an embodiment of a track system in a fully retracted and stowed configuration.

With continued reference to FIG. 1, a hinge 3 provides one first means for connecting the elongated tracks in a contiguous and longitudinal manner as well as arranging the track system 4 from a fully extended configuration to a fully retracted configuration. Other first means for connecting the elongated tracks as described above include telescopically sliding overlapping elongated tracks from the fully retracted to fully extended configuration and vice versa; temporarily joining two elongated tracks by the use of bolts, nuts, pins or any combination; and temporarily joining two elongated tracks by the use of spherical bearings and molded indentures (not shown). Connection of the elongated tracks results in a continuous track system 4. In the embodiment illustrated in FIG. 1, the hinge 3 may be centered across the border of the two elongated tracks and installed on both of the tracks, thus providing a means to fold the tracks. FIG. 3 illustrates the track system 4 in its folded configuration. By folding the elongated tracks outward (i.e., the fully extended configuration), the elongated tracks are connected end-to-end in a longitudinal manner such that the resultant track system 4 has four contiguous longitudinal sides. In this embodiment, two elongated tracks are utilized. However, for each additional elongated track greater than two, an additional first means for connecting the elongated tracks (e.g., an additional hinge) may be added (not shown).

Figure 14:
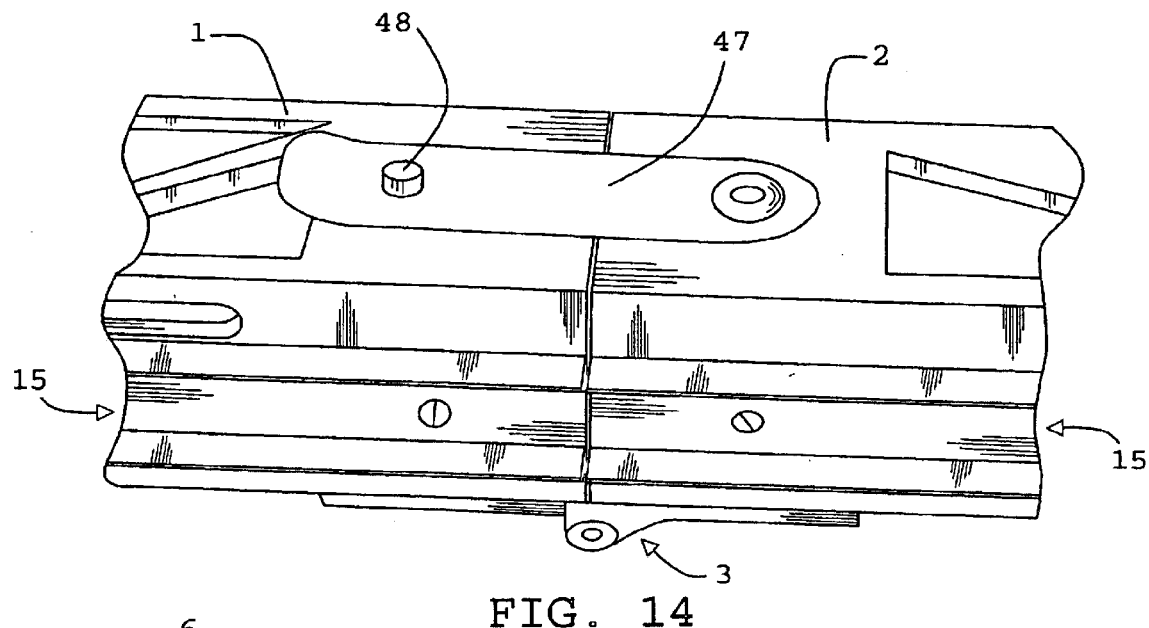
FIG. 14 is a partial perspective view illustrating a lever and locking pin used to interlock two elongated tracks.
Figure 16:
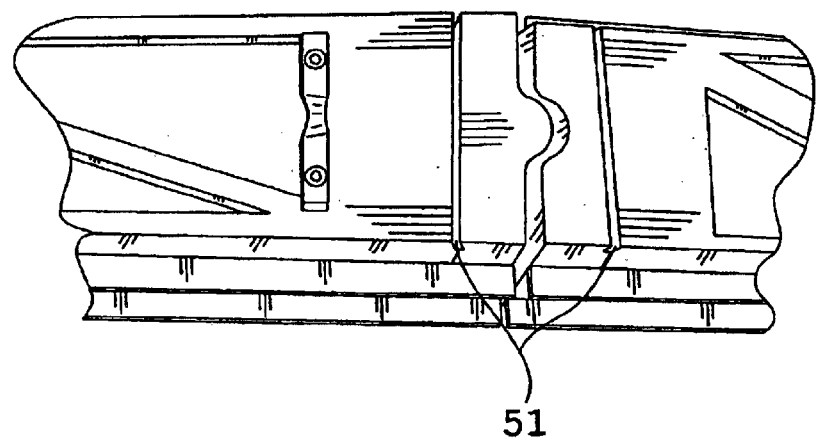
FIG. 16 is a partial perspective view illustrating two adjacent elongated tracks wherein locking grooves are incorporated in each respective elongated track.
Figure 17:
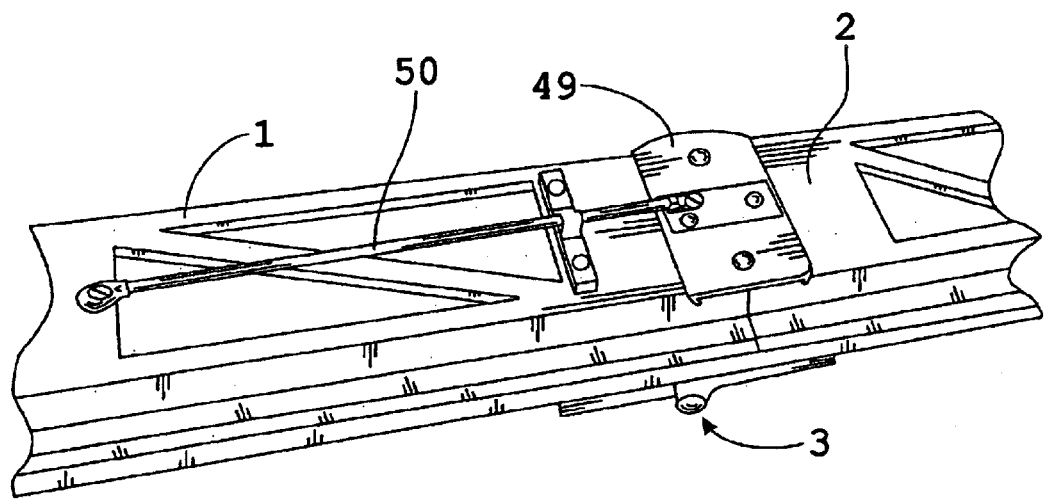
FIG. 17 is a partial perspective view illustrating how a locking plate and security bungee cord may be used to interlock two contiguous elongated tracks.
Figure 18:
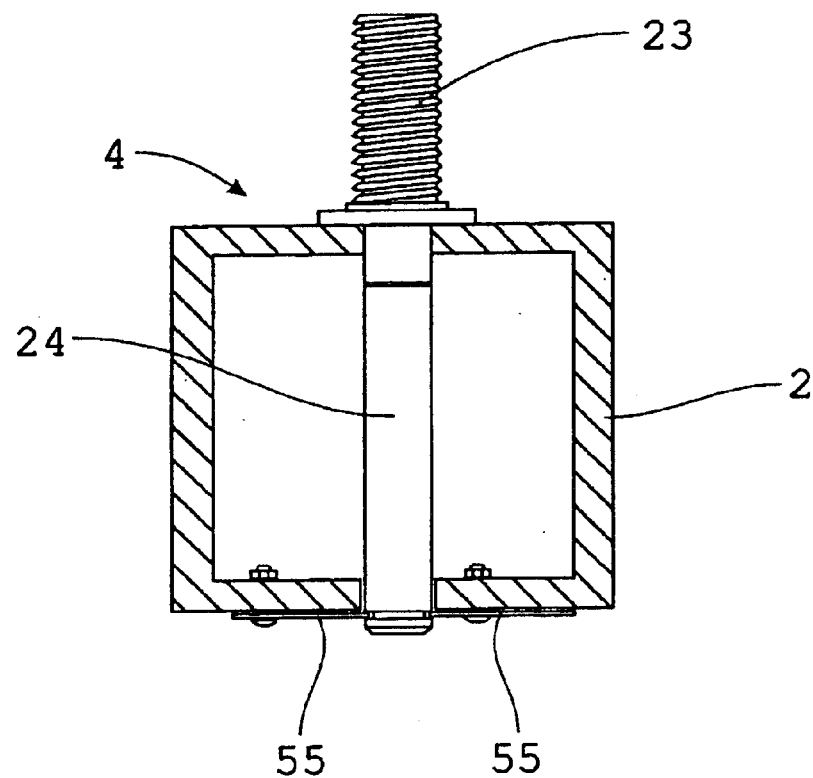
FIG. 18 is a partial cross sectional view illustrating how a winch pin may engage a self-actuating lock.

With reference to FIG. 14, a lever 47 and locking pin 48 lock provides one means for interlocking two contiguous elongated tracks. In one embodiment, the lock comprises a lever 47 and locking pin 48 wherein the lever 47 may be attached to one of the respective contiguous elongated tracks and the locking pin 48 may be connected to the second contiguous elongated track. In the fully extended configuration of this embodiment, the lever 47 may be placed over the locking pin 48 and subsequently pressed down such that the lever 47 captures the locking pin 48 in a lever groove or lever hole, thus interlocking the contiguous elongated tracks. As illustrated in FIGS. 16 and 17, in another embodiment, a means for interlocking two contiguous elongated tracks may be comprised of a locking plate 49 of rigid material slidably connected to one of the respective contiguous elongated tracks and to the other respective contiguous elongated track in the fully extended configuration. In this particular embodiment, the locking plate 49 is slideably connected by use of locking plate grooves 51, which are incorporated into the connecting elongated tracks at predetermined locations. The locking plate 49 is designed to correspond to the design of the locking plate grooves 51 such that a slideable connection can be made. In this embodiment, the locking plate 49 of rigid material may be connected to the track system 4 by a security bungee cord 50 to prevent losing the locking plate 49 when it is not used as a lock. In the embodiment illustrated in FIG. 1, two elongated tracks are utilized. However, for each additional elongated track greater than two, an additional means for interlocking two contiguous elongated tracks (e.g., an additional lock as described above) may be added (not shown).

Figure 5A:
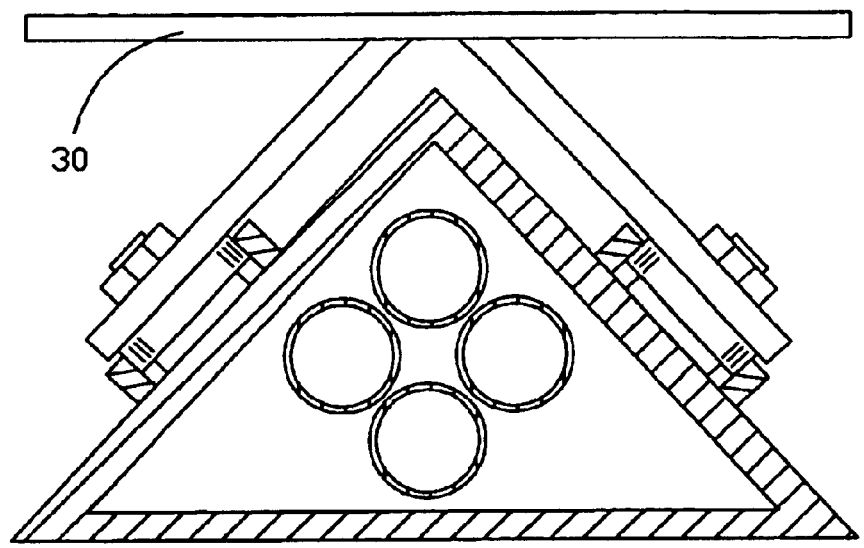
FIG. 5A. is a partial cross-sectional view of an embodiment for an apparatus.
Figure 5B:
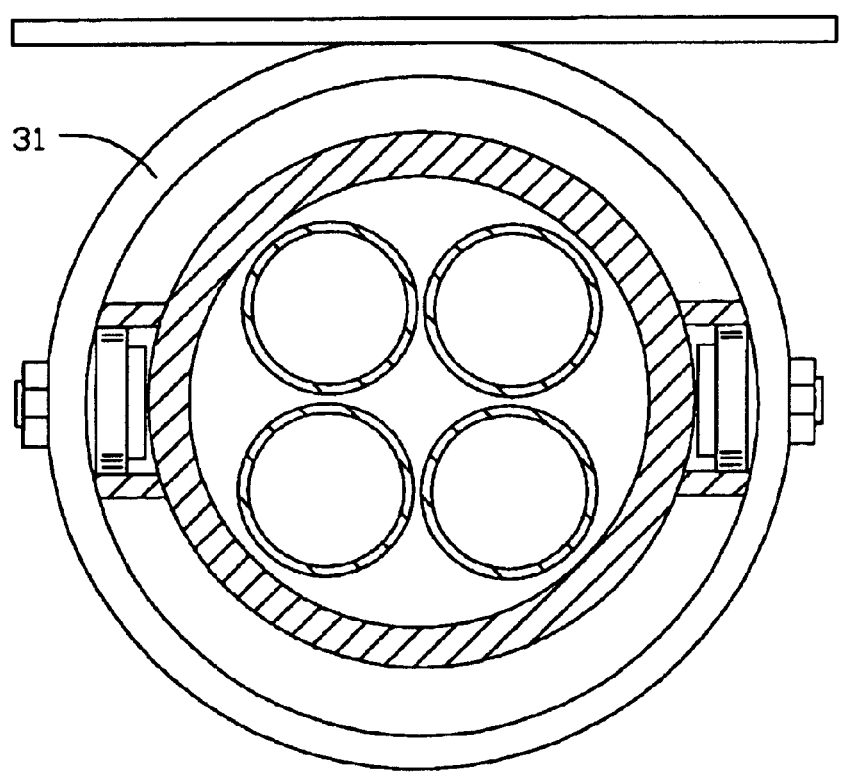
FIG. 5B. is another partial cross-sectional view of an embodiment for an apparatus.
Figure 6:
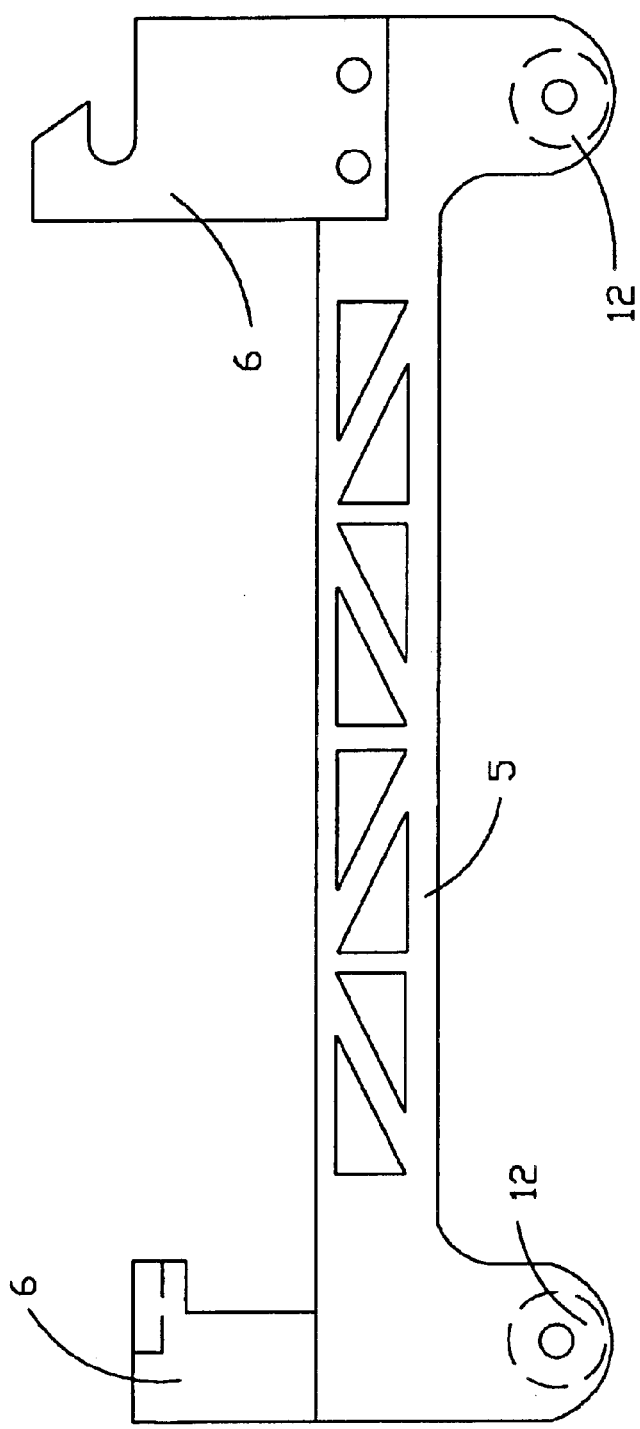
FIG. 6. is a side view illustrating an embodiment of a carrier.
Figure 10:
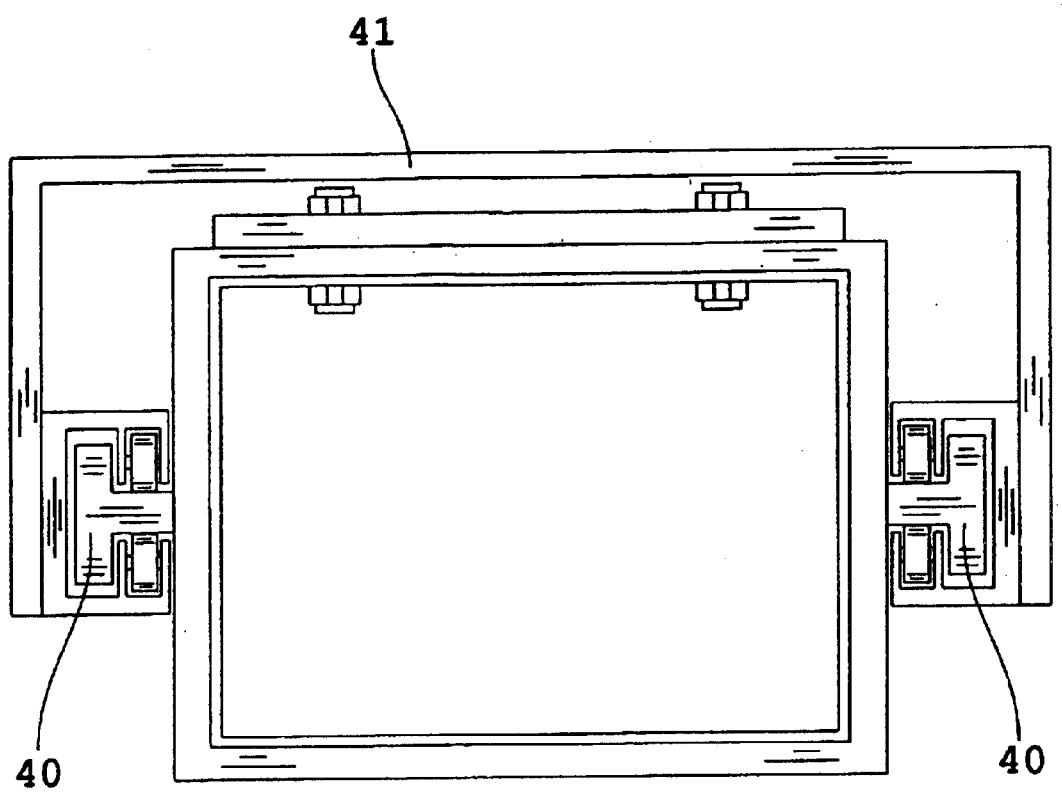
FIG. 10 is a cross sectional view of an embodiment for an apparatus illustrating two longitudinal flanges and a carrier slideably mounted on the two longitudinal flanges.
Figure 11:
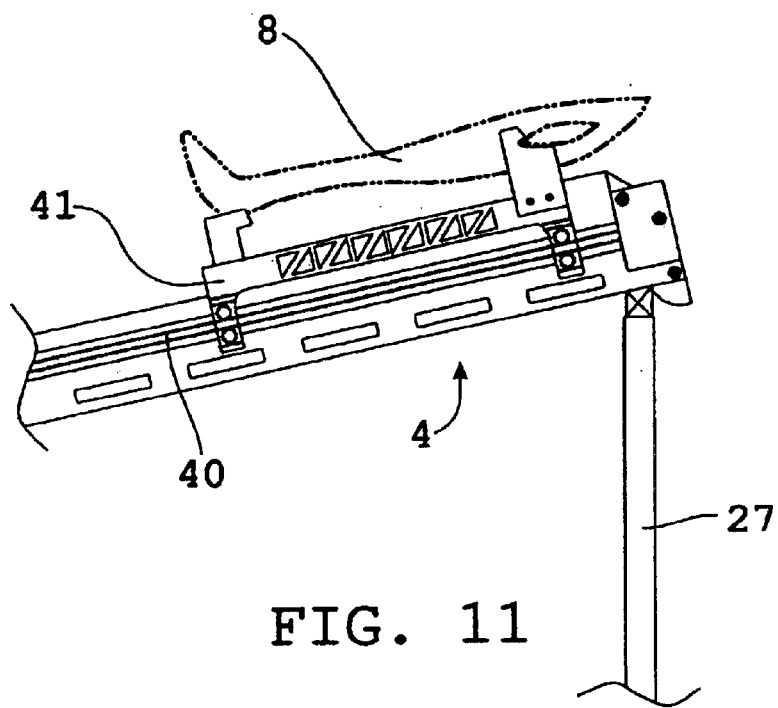
FIG. 11 is a partial side view of an embodiment of an apparatus illustrating a carrier slideably mounted on longitudinal flanges.
Figure 12:
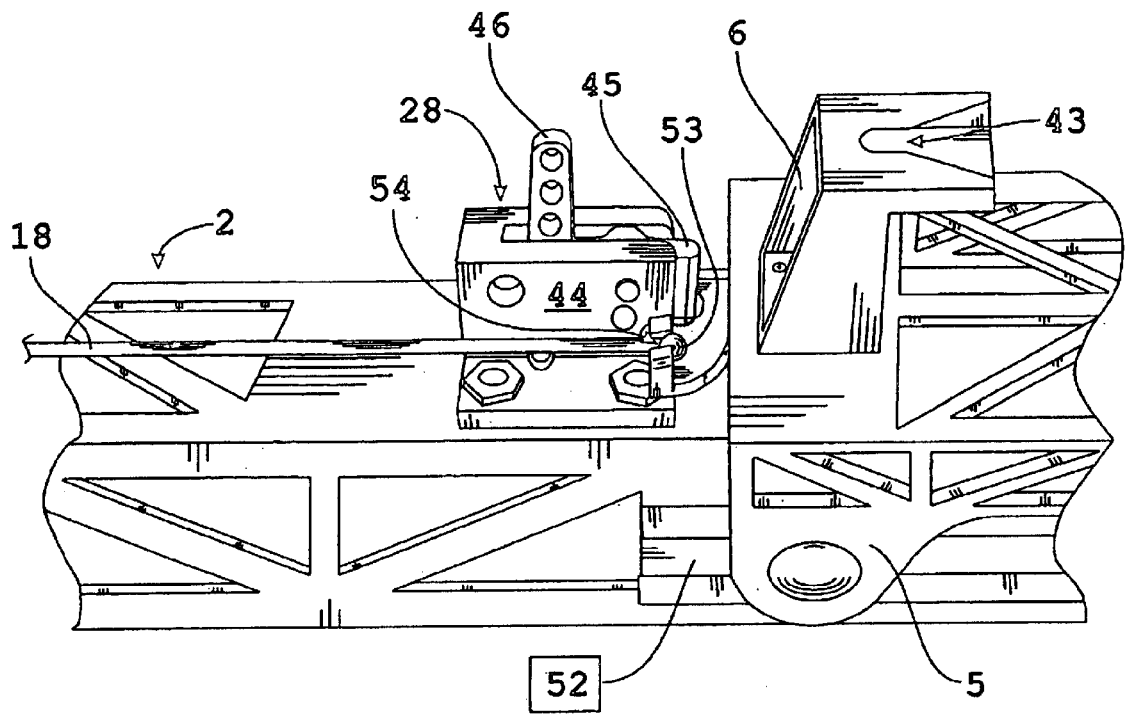
FIG. 12 is a partial perspective view illustrating a carrier slideably mounted to at least one elongated track, wherein the carrier is interlocked with a trigger mechanism. Also illustrated is a second cable temporarily secured via a spherical bearing attached to the second cable wherein the spherical bearing is engaged with a cable catch.

With continued reference to FIG. 1 and reference to FIG. 6, a carrier 5 is slidably mounted to the track system 4. With reference to FIGS. 10 and 11, a flange-based carrier 41 is slideably mounted to a track system. In an embodiment, the grooves 15 or flanges 40, as discussed above, are the primary means to slidably mount a carrier on the track system 4. Further, the grooves 15 or flanges 40 also serve as guide rails to ensure a proper trajectory for a carrier during the launch phase. With continuing reference to FIG. 1, a secondary means to slidably mount the carrier 5 on the track system 4 may include the use of a multiplicity of bearings engaging the carrier 5 and track system 5. As illustrated in FIG. 6, in one embodiment, roller bearings 12 may engage both the carrier 5 and track system 4 thereby reducing the amount of friction during the launch phase. In another embodiment, friction during the launch phase may be further reduced by using a dry style lubricant 52 as illustrated in FIG. 12. In a third embodiment, the primary and secondary means discussed above are both employed. In a fourth embodiment, the individual use of the primary or secondary means for slidably mounting the carrier 5 to the track system 5 is utilized. Further, in an embodiment, two (2) roller bearings installed on each longitudinal side of the carrier (four (4) total roller bearings 12) may be used as illustrated in FIG. 6. In additional embodiments, a multiplicity of roller bearings may be used. As illustrated in FIG. 6, in an embodiment, the carrier 5 may be generally elongated in shape and may include a cross-sectional design having a generally rectangular shape. In this embodiment, the carrier's cross-sectional design forms a cavity as part of the carrier structure. In another embodiment, a carrier cross-sectional design that results in a carrier that is solid to the core is used (not shown). The shape of the carrier may be a function of the shape of the elongated tracks. Therefore multiple embodiments consisting of multiple shapes and sizes for the carrier exist. As an example, FIG. 5A illustrates a generally triangular shape for a carrier 30. As an example, FIG. 5B illustrates a generally elliptical or more specifically, circular, shape for a carrier 31.

With continued reference to FIG. 1, and reference to FIG. 6, FIG. 12, FIG. 13, FIG. 18, and FIG. 20, in an embodiment, an adapter 6 may be temporarily connected to the carrier and provides a means to temporarily attach an aircraft 8. In an embodiment, the adapter 6, is comprised of a center launch bracket and two side brackets, wherein the center launch bracket and two side brackets are temporarily attached to the carrier 5. In one embodiment, the adapter 6 is temporarily attached to the carrier 5 by fasteners such as screws, nuts, bolts, or the like. In another embodiment (not otherwise shown), the adapter 6 is temporarily attached to the carrier 5 by a plurality of self-actuating latch/pin devices. Multiple means for attaching the adapter 6 to the carrier 5 exist. In this embodiment, the adapter 6 may utilize slots 43 to interface with the aircraft. The number of slots 43 and their design may be a function of the aircraft interface. Thus, for different aircraft, different adapters may be switched out and temporarily connected to the carrier. The design as illustrated in the figures is not intended in any way to limit other designs. As stated before, the adapter's design may be a function of the aircraft interface. In another embodiment, the function of an adapter may be integrated with the carrier. In this embodiment (not otherwise shown), there is no separate adapter element.

Figure 2:
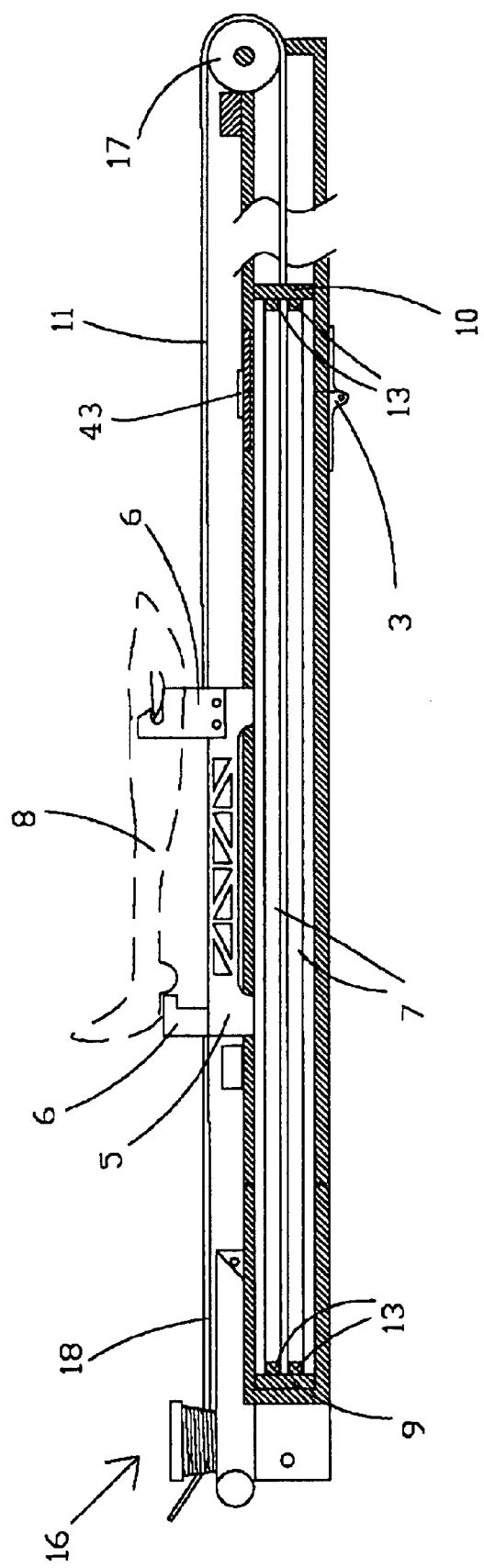
FIG. 2. is a longitudinally-sectional, partially cut-away view of an embodiment of an apparatus.
Figure 9:
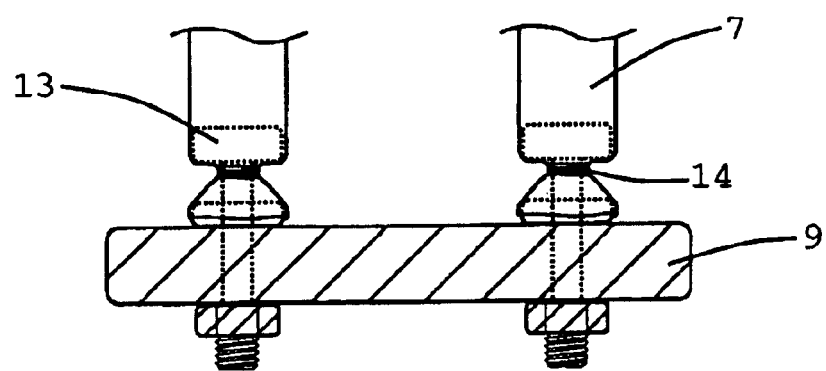
FIG. 9. is a partial side, partial cross sectional view of an embodiment for a mounting plate, capture screws, tie devices, and latex surgical tubes.

With reference to FIG. 2 and FIG. 9, in an embodiment, a multiplicity of latex surgical tubes 7 is one means for propelling the carrier longitudinally along the track system 4. In another embodiment, one latex surgical tube may be used. Latex may be natural latex. The one or more latex surgical tubes 7 store potential energy and subsequently convert the stored potential energy to kinetic energy necessary for propelling the carrier 5 and launching the aircraft 8. In additional embodiments, other means for propelling the carrier longitudinally along the track system 4 are used (such as one or more compression springs, one or more extension springs, one or more roll springs, or one or more elongated elastic members such as one or more polyurethane bands, one or more latex bands, one or more surgical tubes, one or more silicone bands, or one or more bungee cords). The means for propelling the carrier longitudinally along the track system may be resistant to extreme temperatures, for example, sub-zero temperatures. The means for propelling the carrier longitudinally along the track system may operate in a temperature range from about −65 degrees F. to about 180 degrees F. The means for propelling the carrier longitudinally along the track system may have an elongation at break up to about 750%. Another embodiment consists of a combination of the defined means for propelling the carrier (not shown). If two or more means for propelling the carrier are used, these means for propelling may be installed parallel with respect to each other. An embodiment utilizes one or more latex surgical tubes with a predetermined outer diameter (OD). In another embodiment, depending on the initial launch condition requirements, the OD for the latex surgical tubes may be scaleable. This scalability may also result in scaling the dimensions of other elements of the apparatus (e.g., the elongated tracks, carrier, combinations of elements, all of the elements, etc.). With reference to FIG. 2, a third embodiment may utilize five latex surgical tubes of 0.625 inches OD latex surgical tubes attached to two mounting plates 9, 10 of rigid material (for example, a metal). In an embodiment, the means for propelling has two ends wherein connecting the means for propelling to each mounting plate 9, 10 may be accomplished by a capture screw 13 secured by a tie device 14 within both ends of the means for propelling as partially illustrated in FIG. 9. Multiple embodiments exist for the tie device 14, for example a wire (as illustrated in FIG. 9), a clip (not shown), or a clamp (not shown). In an embodiment, the means for propelling may comprise one or more latex surgical tubes 7, thus, two sets of one or more capture screws (hereinafter referred to as the first set and second set of one or more capture screws) and two sets of one or more tie devices (hereinafter referred to as the first and second set of one or more tie devices) are required for this specific embodiment (one set for each end of the one or more latex surgical tubes 7). As illustrated in FIG. 2, in an embodiment, two mounting plates (hereinafter referred to as the first mounting plate 9 and second mounting plate 10) may be required for each set of one or more capture screws 13. In this embodiment, the first set of one or more capture screws 13 may be attached to the first mounting plate 9 and the second set of one or more capture screws 13 may be attached to the second mounting plate 10. Further, one end of the one or more latex surgical tubes may be attached to the first set of the one or more capture screws 13. Secondly, the other end of the one or more latex surgical tubes 7 may be attached to the second set of the one or more capture screws 13. Thirdly, the first set of one or more tie devices 14 may be wrapped around one end of the one or more latex surgical tubes 7 to secure the one end to the first set of the one or more capture screws 13. Finally, the second set of one or more tie devices 14 may be wrapped around the other end of the one or more latex surgical tubes 7 to secure the other end to the second set of the one or more capture screws 13. In an embodiment, the first mounting plate 9 may be adjustably attached to the track system 4. Use of the first mounting plate 9, the first set of one or more capture screws 13, and the first set of one or more tie devices 14 independently or in any combination represents one means to adjustably attached one end of the means for propelling relative to the track system 4. As illustrated in FIG. 2, in an embodiment, the second mounting plate 10 may be connected to a first cable 11, which is described in more detail below. The use of a first cable 11, second mounting plate 10, second set of one or more capture screws 13, and second set of one or more tie devices 14 independently or in any combination represents one second means for connecting the means for propelling to the carrier. In an embodiment, the first cable 11 may be permanently or temporarily affixed to the carrier 5. The attachment of the means for propelling to the track system 4 may be at any point, but it is recognized that if this attachment is as far aft as possible relative to the track system 4, then this location maximizes the potential energy storage and acceleration length. In addition; attachment of the means for propelling to the track system 4 may be adjustable in a longitudinal manner thereby providing a means to vary the amount of potential energy necessary to launch aircraft of varying mass. In another embodiment, an ultraviolet or "UV" coating 39 as illustrated in FIG. 2 may be applied to the latex surgical tubes to protect the latex surgical tubes from UV induced degradation.

Figure 7B:
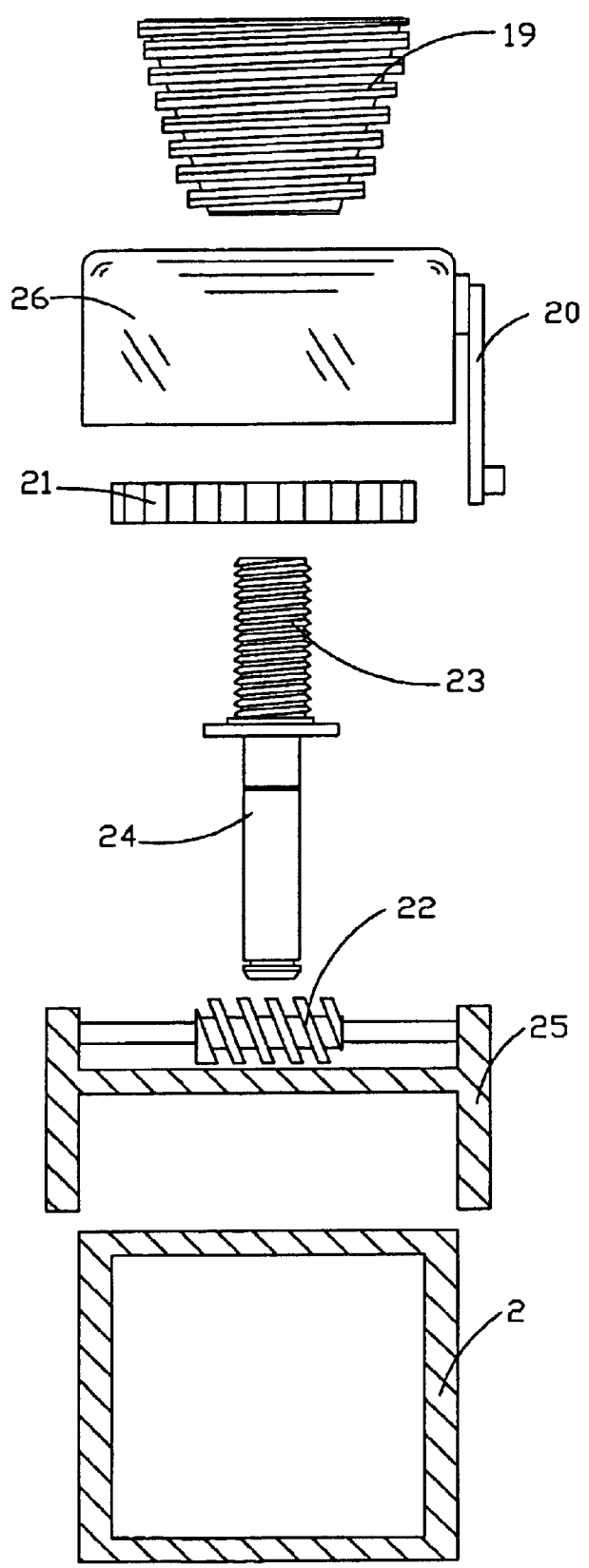
FIG. 7B. is an exploded, partial cross sectional view of an embodiment of a winch system in relation to an elongated track.
Figure 19:
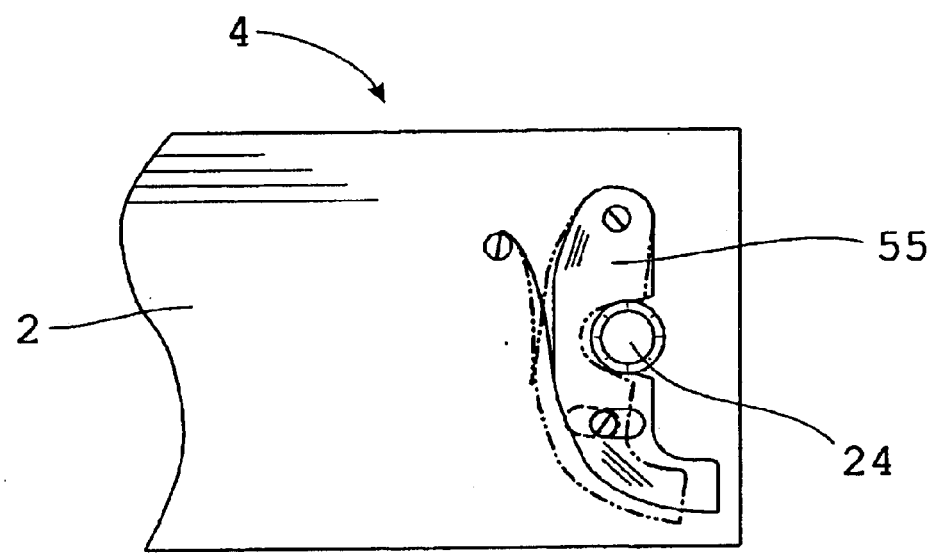
FIG. 19 is a partial top view of an end section of an elongated track and track system illustrating how a self-actuating lock may engage a tapered end of a winch pin.
Figure 20:
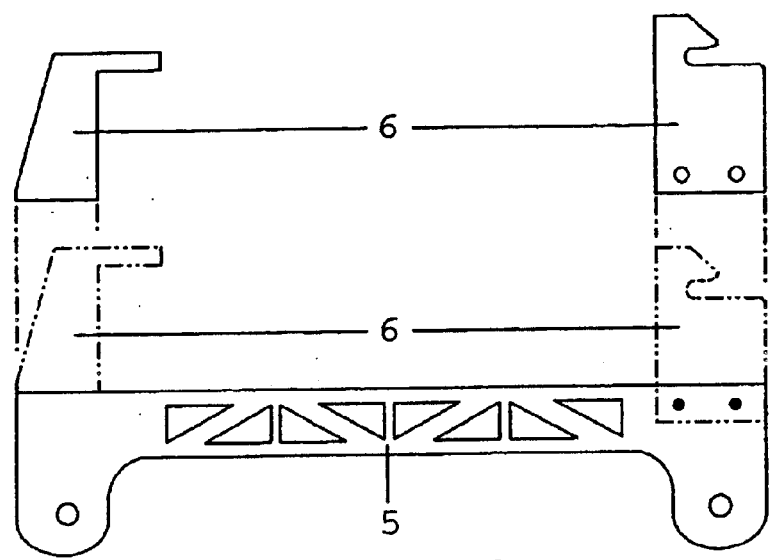
FIG. 20 is a side view of a carrier and an adapter illustrating how the adapter can be detached and similarly attached to the carrier.

With continued reference to FIG. 1, FIG. 2, FIG. 3, and FIG. 4, in an embodiment, a manually driven winch system 16, pulley 17, first cable 11, and second cable 18, may be used to move the carrier 5 into a launch position. In another embodiment, a motor driven winch system is used. As stated earlier, the first cable 11 is part of a second means for connecting the means for propelling to the carrier 5. Moving the carrier 5 to the launch position increases the potential energy of the means for propelling the carrier longitudinally along the track system 4. As illustrated in FIG. 2, in an embodiment, the carrier 5 may be moved to the launch position by a second cable 18 and the manually driven winch system 16. The second cable 18 is part of a third means for connecting the carrier to the manually driven winch system 16. With particular reference to FIG. 12, in an embodiment, the connection of the second cable 18 to the carrier 5 may comprise one or more cable spherical bearings 53 attached to the second cable 18 and a cable catch 54 attached to the carrier 5 wherein one of the one or more cable spherical bearings 53 are fastened to the cable catch 54. More than one spherical bearing may be installed on the second cable 18 to provide adjustability as well as redundancy in case of damage. In an embodiment, the second cable may be unfastened to the cable catch 54 prior to launch but after the trigger 28 (discussed below in more detail) has engaged the carrier 5. The second cable 18, one or more cable spherical bearings 53, and cable catch 54 individually or in any combination is one third means of connecting the carrier 5 to the manually driven winch system 16. An exploded view of an embodiment of the manually driven winch system is illustrated in FIGS. 7A and 7B. With reference to FIG. 7A and FIG. 7B, in an embodiment, the manually driven winch system 16 employs a tapered winch spool 19 to manually wind the second cable 18 and thus, move the carrier 5 into the launch position by cranking a handle 20 while maintaining a relatively uniform input torque during the entire process of moving the carrier 5 into its launch position. In an embodiment, the winch handle 20 may be foldable. In another embodiment, a non-foldable winch handle is used (not shown). Further, in the embodiment whereby the manually driven winch system 16 is used, a first worm gear 21 and a second worm gear 22 may be used to provide the required gear reduction and avoid the back-drive potential of the winding mechanism. In this embodiment, a threaded cylinder 23 may be employed to lock the first worm gear 21 and tapered winch spool 19 as an integrated winch system. As illustrated in FIGS. 7A, 7B, 18, and 19, in an embodiment, the manually driven winch system 16 may be mounted on one of the elongated tracks by a winch pin 24, which may be attached to the threaded cylinder 23, a winch plate 25, which may be secured to the track system by the winch pin 24 and threaded cylinder 23 assembly, as well as a self-actuating lock 55, which may be attached to the track system 4 and secures the winch pin 24 to the track system 4. FIG. 19 illustrates how an embodiment of a self-actuating lock 55 engages a tapered end of a winch pin 24 such that the self-actuating lock slightly recoils via a simple spring mechanism and subsequently locks itself to the winch pin 24. In an embodiment, a cover 26 may be employed as illustrated in FIG. 7A and FIG. 7B.

Figure 13:
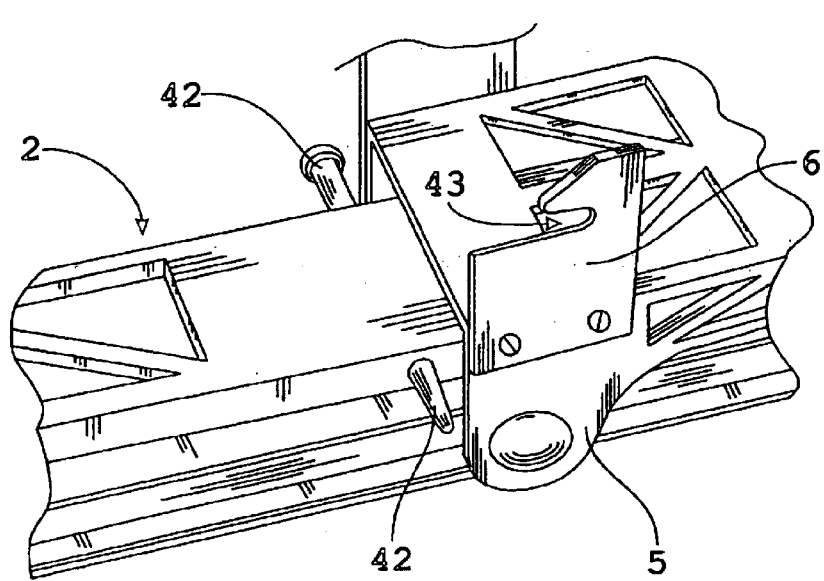
FIG. 13 is a partial perspective view illustrating a carrier slideably mounted to at least one elongated track wherein a safety pin engages an elongated track and is used to prevent a premature launch.

With continued reference to FIG. 1, FIG. 12, FIG. 21A, and FIG. 21B, a trigger 28 may lock the carrier 5 in the launch position as well as releases the carrier 5 from the launch position thereby launching the aircraft 8. The trigger 28 is attached to an elongated track in such a location wherein the carrier 5 is temporarily locked to the trigger 28 in a pre-launch position. In an embodiment, the trigger 28 is comprised of a trigger block housing 44, trigger latch 45, trigger release lever 46, and at least one spring (not otherwise shown) as is commonly known in the art. In an embodiment, the trigger 28 may be self-actuating. For example, the carrier 5 is moved to a launch position and interlocks with the trigger latch 45 in such a manner whereby no manual intervention is required. Specifically, the trigger latch 45 recoils upon contact with the carrier 5, wherein the recoil movement activates the at least one spring and the trigger release lever 46 in a coordinated movement. In another embodiment, a non self-actuating trigger is used (not shown). With reference to FIG. 13, in an embodiment, a safety pin 42 may be employed to ensure an unintentional launch does not occur. In this particular embodiment, the safety pin 42 is placed in a predetermined position in front of the carrier 5 when the carrier 5 is in its pre-launch position. Thus, if the trigger 28 is unintentionally activated, the safety pin 42 if properly used, will retain the carrier 5 and prevent an unintentional launch.

Figure 8:
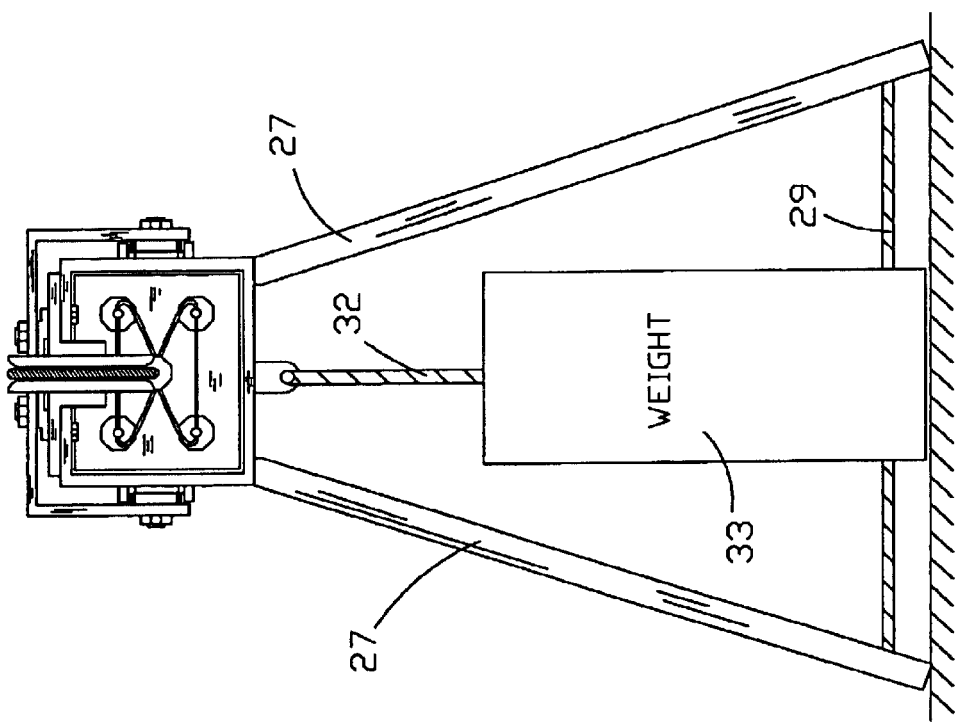
FIG. 8. is an end view of an apparatus with support devices.

With continued reference to FIG. 1 and reference to FIG. 8, in an embodiment, a bi-pod stand 27 may be used to elevate and aid in the securing of the track system 4 in its fully extended configuration at a predetermined angle relative to a surface. Other embodiments for the stand, such as tri-pod, telescopic, and an adjustable jack exist (not shown). As illustrated in FIG. 8, in an embodiment, a first cord 29 may be attached to one of the elongated members of the bi-pod stand 27 on one end and to the other elongated member of the bi-pod stand on the other end secures the track system 4 to a surface. Specifically, rocks or other heavy material may be set on top of the first cord thereby minimizing any movement of the track system 4 resultant from a launch. In another embodiment, a second cord 32 may be attached to one of the elongated tracks and subsequently attached to a weight 33. In one embodiment, the weight may be a container 34 (ref. FIG. 3) that is used to stow the apparatus. In this manner, a downward force is applied to minimize movement of the track system 4 as a result of the launching process. Thus, the container 34 may serve two functions. The container's 34 primary function is to stow the apparatus in its retracted configuration for easy transport. The container may also serve as the weight 33 to minimize the movement of the track system 4 during an actual launch.

Figure 15:
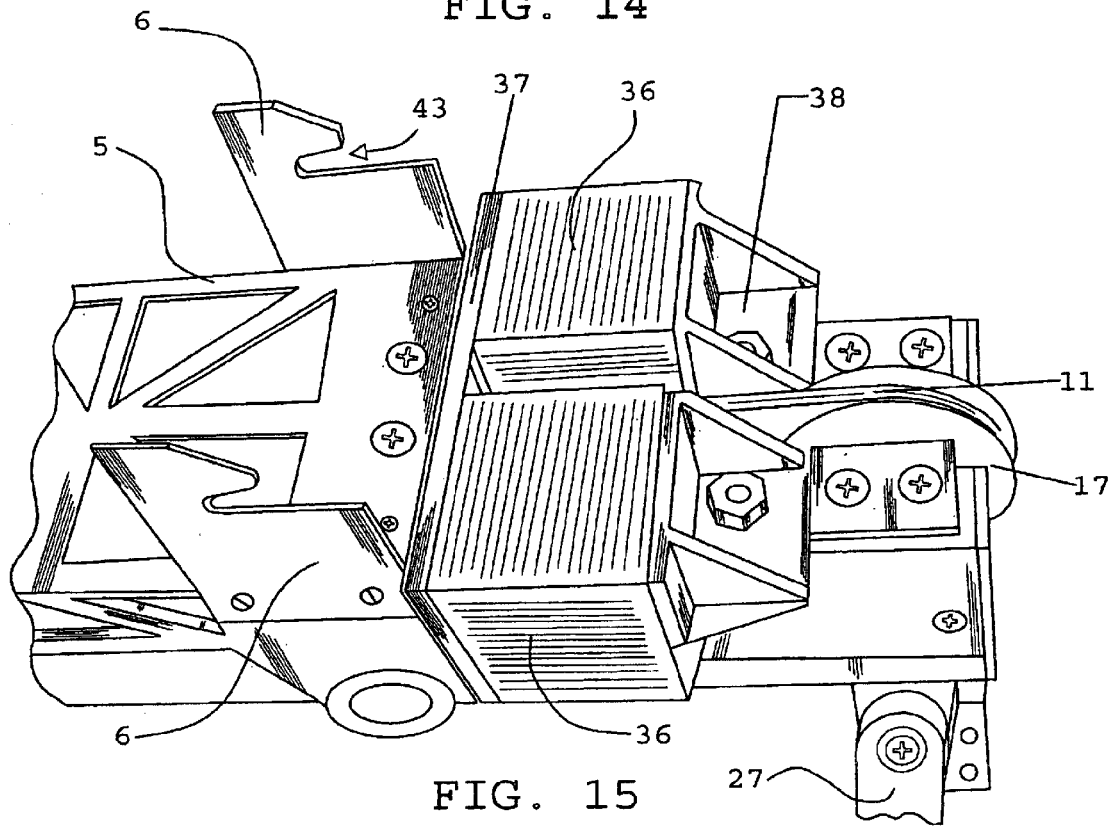
FIG. 15 is a partial perspective view illustrating a first and second barrier plate as well as an energy absorbing material attached to an elongated track.

With continued reference to FIG. 1 and FIG. 3, as well as reference to FIG. 15, an energy absorption barrier 35 may be used to absorb excess kinetic energy remaining at the end of the launch sequence. In an embodiment, an energy absorbing material 36 may be sandwiched between two barrier plates 37, 38 to form the barrier 35. In an embodiment, the barrier 35 may be installed at the end of one of the elongated tracks. The two barrier plates of rigid material 37, 38 may be selected from a group consisting of metal, wood, plastic, and graphite. In one embodiment, the two barrier plates may be comprised of aluminum. The energy absorbing material may be selected from a group consisting of polyurethane, a visco-elastic polymer, and foam. For the purposes herein, foam is defined as any of various light, porous, semi-rigid or spongy materials. For the purposes herein, visco-elastic is defined as any material the exhibits properties of both liquids (viscous solutions) and solids (elastic materials).

The apparatus as described above has two basic configurations: the extended configuration (illustrated in FIG. 1) and the retracted configuration (illustrated in FIG. 3). In the extended configuration, the track system 4 is folded outward to its full length and may be interlocked. In the retracted configuration, the track system 4 is folded inward where it may be interlocked and compactly stored in a backpack or other container.

Multiple methods exist for using the various embodiments described above. With reference to FIGS. 1, 2, 3 and 8, for example, in one method, the user un-stows the apparatus from the container 34 and extends as well as interlocks the track system 4, comprised of two elongated tracks, to its full length. The locking plate 49 is used to lock the two elongated tracks together. The user then uses the bi-pod stand 27 to elevate and aid in the securing of the track system 4 in its fully extended configuration at a predetermined angle relative to a surface. The user then uses rocks or other heavy material on top of the first cord 29 attached to the bi-pod stand 27 to help secure the track system 4 to the surface. The user next secures the container 34 to the second cord 32, which is attached to one of the elongated tracks and subsequently is used as a weight 33. After the track system 4 is secured to the surface, it is ready for operation. The user temporarily secures the second cable 18 via the attached spherical bearing 53 to the cable catch 54 and then moves the carrier 5 to the launch position via a manually driven winch system 16, pulley 17, first cable 11, and second cable 18 thereby extending the means for propelling the carrier, which herein in this embodiment comprises a multiplicity of latex surgical tubes 7. The carrier 5 is locked in a launch position by the trigger 28, which is self-actuating. The user employs the safety pin 42 in its predetermined location to ensure an unintentional launch does not occur. The user next temporarily attaches the aircraft 8 to the adapter 6, which is temporarily secured to the carrier 5. When the user is ready to launch the aircraft 8, the user will remove the safety pin 42 as well as the second cable 18 from the cable catch 54 and then release the trigger 28. The subsequently conversion of stored potential energy to kinetic energy in the multiplicity of latex surgical tubes 7 propels the carrier 5 along the track system 4. At the end of the launch sequence, the carrier 5 impacts the energy adsorption barrier 35 and the aircraft 8 is launched. After the aircraft 8 is launched, the user removes the rocks or other heavy material on top of the first cord 29 and de-attaches the container 34 from the second cord 32. The user then disengages the locking plate 49 to unlock the two elongated tracks. The user next retracts the apparatus, prepares the apparatus for stowage, and stows the apparatus in the container 34.

The corresponding structures, materials, acts, and equivalents of all means or step plus function elements in the claims below are intended to include any structure, material, or acts for performing the functions in combination with other claimed elements as specifically claimed.

The embodiment of the apparatus described herein are only for purposes of illustration and understanding of the apparatus. Those skilled in the art will be able to devise other embodiments of this apparatus, which do not depart from the spirit of the apparatus as disclosed herein. Accordingly, the apparatus shall be limited in scope only by the attached claims.

What is claimed is:

1. An apparatus for launching an aircraft, comprising:
a multiplicity of interconnected elongated tracks of rigid material forming a track system and wherein each elongated track has a predetermined elongated track cross-sectional design;
a winch system connected to the track system wherein the winch system has a variable mechanical advantage;
one or more elongated surgical latex tubes wherein one end of each of the one or more surgical latex tubes is adjustably connected to the track system, wherein the adjustable connection of the one end of the one or more latex surgical tubes to the track system is formed of a first mounting plate adjustably connected to the track system, a first set of one or more capture screws connected to the first mounting plate on one end of the first set of one or more capture screws and connected to one end of the one or more latex surgical tubes on the other end of the first set of one or more capture screws, and a first set of one or more tie devices wrapped around the one end of the one or more latex surgical tubes connected to the first set of one or more capture screws; and a carrier slidably mounted to the track system wherein the carrier is connected to the winch system and to the other end of each of the one or more elongated elastic members.

2. The apparatus of claim 1, wherein the connection of the carrier to the other end of the one or more latex surgical tubes is formed of a first cable connected to the carrier on one end of the first cable, a second mounting plate where the second mounting plate is connected to the first cable on the first cable's other end, a second set of one or more capture screws connected to the second mounting plate on one end of the second set of one or more capture screws and connected to the other end of the one or more latex surgical tubes on the other end of the second set of one or more capture screws, and a second set of one or more tie devices wrapped around the other end of the one or more latex surgical tubes connected to the second set of the one or more capture screws.

3. The apparatus of claim 2, wherein the carrier is connected to the winch system by a second cable.

4. An apparatus for launching an aircraft, comprising:

a multiplicity of interconnected elongated tracks of rigid material forming a track system and wherein each elongated track has a predetermined elongated track cross-sectional design;

a winch system connected to the track system wherein the winch system has a variable mechanical advantage and wherein the winch system is a manually driven winch system and is formed of a winch pin wherein the winch pin is attached to the track system, a threaded cylinder wherein the threaded cylinder is attached to the winch pin, a winch plate wherein the winch plate is secured by the winch pin and threaded cylinder to the track system, a first worm gear wherein the first worm gear is attached to the winch plate, a second worm gear wherein the second worm gear is attached the threaded cylinder, a handle wherein the handle is attached to the winch plate, and a tapered winch spool wherein the tapered winch spool is attached to the threaded cylinder;

one or more elongated elastic members wherein one end of each of the one or more elongated elastic members is adjustably connected to the track system; and a carrier slidably mounted to the track system wherein the carrier is connected to the winch system and to the other end of each of the one or more elongated elastic members.

5. The apparatus of claim 4, wherein the winch system further comprises a self-actuating lock wherein the lock is attached to the track system and secures the winch pin to the track system.

6. The apparatus of claim 5, wherein the winch system further comprises a cover wherein the cover is attached to and covers the winch plate.

7. An apparatus for launching an unmanned, remotely piloted aircraft, comprising:

a multiplicity of elongated tracks of rigid material forming a track system;

first means for connecting the multiplicity of elongated tracks in a contiguous and longitudinal manner and wherein the first means for connecting provides a means to store and set-up the track system in a retracted and extended configuration, respectively;

a manually driven winch system attached to the track system wherein the winch system has a variable mechanical advantage and wherein the winch system is formed of a winch pin wherein the winch pin is attached to the track system, a threaded cylinder wherein the threaded cylinder is attached to the winch pin, a winch plate wherein the winch plate is secured by the winch pin and threaded cylinder to the track system, a first worm gear wherein the first worm gear is attached to the winch plate, a second worm gear wherein the second worm gear is attached the threaded cylinder, a handle wherein the handle is attached to the winch plate, and a tapered winch spool wherein the tapered winch spool is attached to the threaded cylinder;

a carrier of a predetermined carrier cross-sectional design slidably mounted to the track system and connected to the manually driven winch system;

means for propelling the carrier longitudinally along the track system;

an adapter temporarily connected to the carrier and providing a means to temporarily attach the aircraft;

a trigger attached to the track system used to temporarily lock the carrier in a launch position and subsequently release the carrier;

a stand attached to the track system wherein the stand props the track system on a surface at a predetermined angle with respect to the surface; and a barrier attached to the track system wherein the barrier absorbs excess energy.

8. An apparatus for launching a surveillance aircraft, comprising:

a multiplicity of elongated tracks of rigid material wherein the elongated tracks are interconnected to form a contiguous track system and wherein each of the multiplicity of elongated tracks has one or more longitudinal grooves that extend the full length the track system;

one or more hinges installed on two contiguous elongated tracks each hinge centered across the two contiguous elongated tracks for connecting the contiguous elongated tracks to each other in a longitudinal and continuous manner forming a contiguous surface on all four longitudinal sides and providing a means to fold and unfold the track system to a retracted and extended configuration, respectively;

one or more locks installed across two contiguous elongated tracks for locking two elongated tracks together in the track system's extended and retracted configurations;

a manually driven winch system attached to the track system wherein the winch system has a variable mechanical advantage;

a carrier of rigid material slidably mounted to the track system along the one or more longitudinal grooves;

an adapter of rigid material temporarily connected to the carrier wherein the adapter comprises a multiplicity of slots to interface and temporarily attach the surveillance aircraft;

a first mounting plate adjustably attached to the track system;

a first set of one or more capture screws attached to the first mounting plate;

one or more latex surgical tubes of a predetermined outer diameter wherein the first end of the one or more latex surgical tubes is attached to the first set of one or more capture screws on an individual basis;

a first set of one or more tie devices wrapped around the first end of the one or more latex surgical tubes securing the first end of the one or more latex surgical tubes to the first set of one or more capture screws;

a second set of one or more capture screws attached to the second end of the one or more latex surgical tubes on an individual basis;

a second set of one or more tie devices wrapped around the second end of the one or more latex surgical tubes securing the second end of the one or more latex surgical tubes to the second set of one or more capture screws;

a second mounting plate attached to the second set of one or more capture screws;

a first cable attached to the second mounting plate on one end and to the carrier on the other end;

a second cable attached to the carrier on one end and to the winch system on the other end;

a trigger attached to the track system used to temporarily lock the carrier in a launch position and subsequently release the carrier;

a stand attached to the track system wherein the stand props the track system on a surface at a predetermined angle with respect to the surface; and a barrier attached to the track system wherein the barrier absorbs excess energy.

9. The apparatus of claim 8, wherein each of the one or more locks is formed of a locking plate of rigid material slidably connected to one of the elongated tracks and to a contiguous elongated track relative to the one of the elongated tracks.

10. The apparatus of claim 8, wherein the carrier is formed of a structural body of the material, a multiplicity of support members attached to the structural body, and a multiplicity of bearings attached to the multiplicity of support members on an individual basis.

11. The apparatus of claim 8, wherein each of the one or more latex surgical tubes is selected from the group consisting of polyvinyl chloride, and thermo plastic elastomer polymers.

12. The apparatus of claim 8, further comprising a pulley attached to the track system wherein the first cable is threaded around the pulley.

* * * * *